US008181507B2

(12) United States Patent
McLain et al.

(10) Patent No.: US 8,181,507 B2
(45) Date of Patent: May 22, 2012

(54) WIND CONDITION BASED VAPOR LEAK DETECTION TEST

(75) Inventors: Kurt D. McLain, Clarkston, MI (US); Wenbo Wang, Novi, MI (US); Zhong Wang, Westland, MI (US); William R. Cadman, Fenton, MI (US)

(73) Assignee: GM Global Technology Operations LLC

( * ) Notice: Subject to any disclaimer, the term of this patent is extended or adjusted under 35 U.S.C. 154(b) by 804 days.

(21) Appl. No.: 12/132,192

(22) Filed: Jun. 3, 2008

(65) Prior Publication Data

US 2009/0293599 A1 Dec. 3, 2009

(51) Int. Cl.
*G01M 3/00* (2006.01)

(52) U.S. Cl. ...................................... 73/114.39; 73/49.2

(58) Field of Classification Search ................... 73/49.2, 73/49.7, 114.39
See application file for complete search history.

(56) References Cited

U.S. PATENT DOCUMENTS

| | | | | |
|---|---|---|---|---|
| 5,542,397 | A * | 8/1996 | Takahata et al. | 123/520 |
| 5,549,094 | A | 8/1996 | Tomisawa | |
| 5,845,625 | A * | 12/1998 | Kidokoro et al. | 123/520 |
| 6,148,803 | A * | 11/2000 | Majima et al. | 123/520 |
| 6,161,423 | A * | 12/2000 | Okuma | 73/40 |
| 6,370,945 | B2 * | 4/2002 | Roberts | 73/49.5 |
| 6,637,415 | B2 * | 10/2003 | Yoshioka et al. | 123/518 |
| 6,712,049 | B2 * | 3/2004 | Kawano | 123/520 |
| 6,901,786 | B2 * | 6/2005 | Hart | 73/40.5 R |
| 7,347,194 | B2 * | 3/2008 | Sato | 123/520 |
| 7,762,126 | B2 * | 7/2010 | Shibuya | 73/114.39 |
| 2003/0019482 | A1 | 1/2003 | Kawano | |
| 2007/0199374 | A1 | 8/2007 | Shibuya | |

* cited by examiner

*Primary Examiner* — Freddie Kirkland, III

(57) ABSTRACT

A control system comprising a wind condition determination module that determines a wind condition and a leak detection test control module that selectively diagnoses a vapor leak associated with a vehicle based on the wind condition. A method comprising determining a wind condition and selectively diagnosing a vapor leak associated with a vehicle based on the wind condition.

20 Claims, 8 Drawing Sheets

WIND CONDITION BASED VAPOR LEAK DETECTION TEST

FIELD

The present disclosure relates to vapor leak diagnostic systems and methods for vehicles.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

A vehicle having an internal combustion engine includes a fuel tank that stores liquid fuel such as gasoline, diesel, methanol or other fuels. The liquid fuel evaporates into fuel vapors that increase pressure within the fuel tank. Evaporation is caused by energy that is transferred to the fuel tank. Sources of energy include radiation (e.g., sun energy), convection and conduction. Increased vapor pressure in the fuel system may affect the rate that vapor fuel is released into the atmosphere through a leak in the fuel system. Vapor leak diagnostic systems and methods attempt to diagnose vapor fuel leaks.

SUMMARY

Accordingly, the present disclosure provides a control system comprising a wind condition determination module that determines a wind condition and a leak detection test control module that selectively diagnoses a vapor leak associated with a vehicle based on the wind condition. In addition, the present disclosure provides a method comprising determining a wind condition and selectively diagnosing a vapor leak associated with a vehicle based on the wind condition.

Further areas of applicability of the present disclosure will become apparent from the detailed description provided hereinafter. It should be understood that the detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

DETAILED DESCRIPTION

Figure 1:
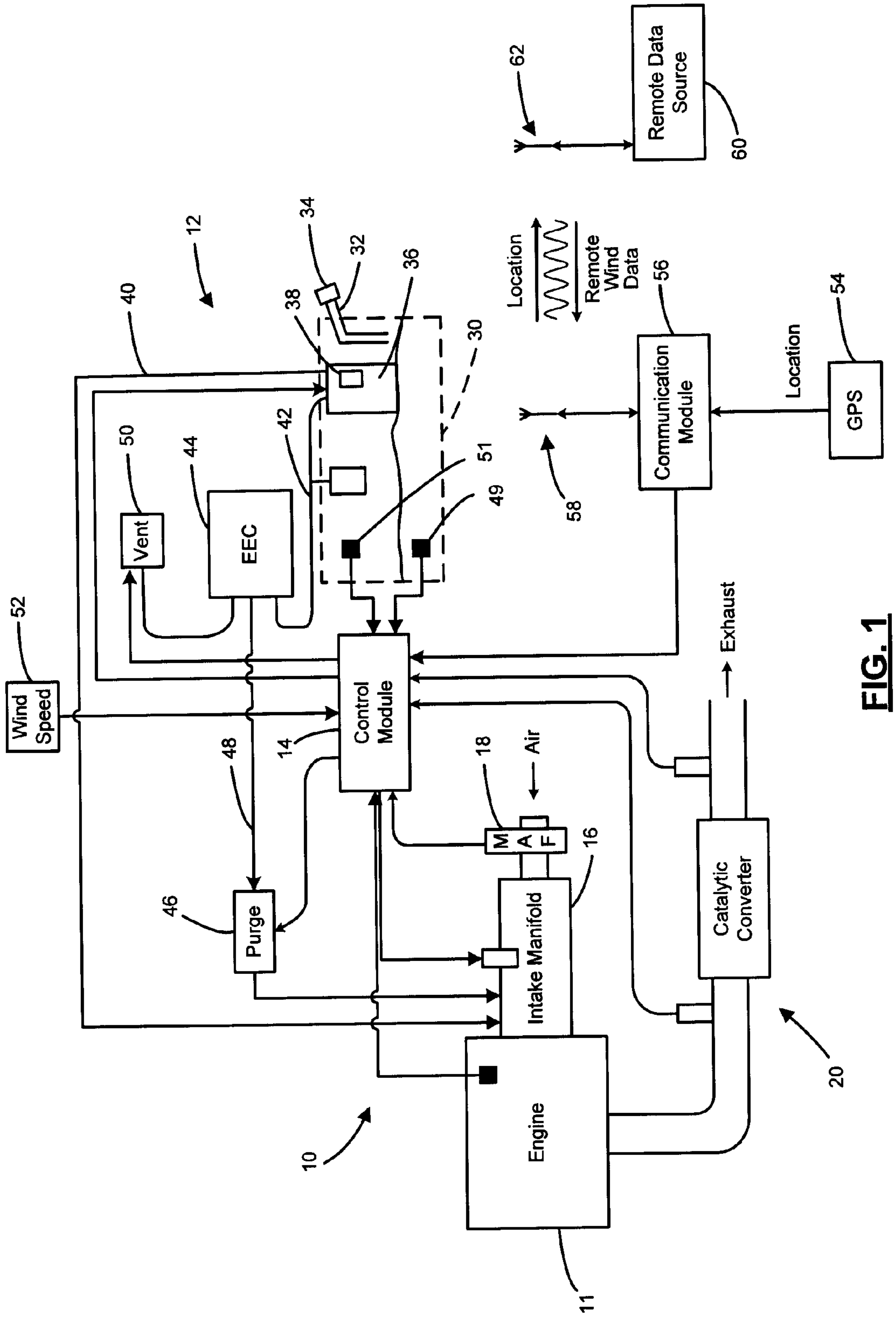
FIG. 1 is a functional block diagram of an exemplary vehicle that is regulated based on a vapor leak diagnostic system and method according to the principles of the present disclosure.

The following description is merely exemplary in nature and is in no way intended to limit the disclosure, its application, or uses. For purposes of clarity, the same reference numbers will be used in the drawings to identify similar elements. As used herein, the phrase at least one of A, B, and C should be construed to mean a logical (A or B or C), using a non-exclusive logical or. It should be understood that steps within a method may be executed in different order without altering the principles of the present disclosure.

As used herein, the term module refers to an Application Specific Integrated Circuit (ASIC), an electronic circuit, a processor (shared, dedicated, or group) and memory that execute one or more software or firmware programs, a combinational logic circuit, and/or other suitable components that provide the described functionality.

Vapor leak diagnostic systems and methods may determine a leak size based on several factors, including fuel level, fuel temperature, engine run time, and accumulated mass airflow. To reduce cost, a vapor leak diagnostic system may not include a fuel temperature sensor. Rather, fuel temperature may be estimated based on engine operating parameters. When the engine is off, the estimated fuel temperature may be fixed for a remainder of a leak detection test.

A vapor leak diagnostic system and method according to the principles of the present disclosure selectively diagnoses a vapor leak based on the presence of wind. High wind may have a significant impact on the actual fuel temperature while the engine is off, causing inaccuracies in the estimated fuel temperature. Inaccuracies in the estimated fuel temperature may cause vapor leak detection errors. The vapor leak diagnostic system and method detects the presence of high wind based on a wind condition signal and disables a leak detection test when the engine is off and the presence of high wind is detected.

Referring now to FIG. 1, a vehicle 10 includes an engine 11 with a fuel system 12. The fuel system 12 selectively supplies liquid and/or vapor fuel to the engine 11 in a conventional manner. A control module 14 communicates with the engine 11 and the fuel system 12. While one control module 14 is shown, multiple control modules may be employed. The control module 14 monitors the fuel system 12 for leaks according to the leak detection system, as will be described below.

Air is supplied to the engine 11 through an intake manifold 16 and mixed with fuel therein. An air flow meter such as a mass airflow (MAF) sensor 18 provides a signal representative of a mass of air or a mass airflow (MAF) signal entering the engine 11 through the intake manifold 16. The control module 14 determines a fuel mass supplied to the engine 11 based on the signal from the MAF sensor 18 and a desired air-fuel ratio. Exhaust gas exits the engine 11 through an exhaust system 20.

The fuel system 12 includes a fuel tank 30 that contains both liquid and vapor fuel. A fuel inlet 32 extends from the fuel tank 30 to an outer portion of the vehicle 10 to enable fuel filling. A fuel cap 34 closes the fuel inlet 32 and may include a bleed tube (not shown). A modular reservoir assembly (MRA) 36 is located inside the fuel tank 30 and includes a fuel pump 38, a liquid fuel line 40, and a vapor fuel line 42. The fuel pump 38 pumps liquid fuel through the liquid fuel line 40 to the engine 11.

Vapor fuel flows through the vapor fuel line 42 into an evaporative emissions canister (EEC) 44. A vapor fuel line 48 connects a purge solenoid valve 46 to the EEC 44. The control module 14 opens the purge solenoid valve 46 to enable vapor fuel flow to the engine 11 and closes the purge solenoid valve 46 to disable vapor fuel flow to the engine 11. The purge solenoid valve 46 may also be positioned between fully open and fully closed positions for partial vapor flow.

The control module 14 modulates a canister vent valve 50 to selectively enable air flow from atmosphere through the EEC 44. A fuel level sensor 49 and a vapor pressure sensor 51 are located within the fuel tank 30 to provide fuel level and pressure signals respectively, which are output to the control module 14. The control module 14 periodically initiates a leak detection test, such as an engine off natural vacuum (EONV) test, to ensure proper sealing of the fuel system 12.

The control module 14 determines a wind condition and either disables or continues the leak detection test based on the wind condition. More specifically, the control module 14 determines whether high wind is present based on a wind condition signal and disables the leak detection test when the engine 11 is off and high wind is present. When high wind is not present, the control module 14 continues the leak detection test. The control module may determine whether high wind is present based on the MAF signal from the MAF sensor 18. In this manner, the cost of additional sensors is avoided. In addition, the control module may determine whether high wind is present based on one or more of a wind speed signal from a wind speed sensor 52 and a remote wind speed signal from a communication module 56.

Accordingly, the vehicle 10 may include the wind speed sensor 52 externally located on the vehicle 10 that provides a wind speed signal to the control module 14. The vehicle 10 may also include a global positioning system (GPS) 54, the communication module 56, and an antenna 58. The GPS 54 monitors location of the vehicle and outputs the location to the communication module 56. For example only, the GPS 54 may determine the vehicle location based on data provided by a satellite system. The vehicle location may be, for example, a zip code, a county, an address, a coordinate (e.g., longitude and latitude), and/or any other suitable location parameter.

The communication module 56 transmits the vehicle location to a remote data source 60 via the antenna 58. The remote data source 60 receives the vehicle location via another (remote) antenna 62. The remote data source 60 may be any suitable source of wind speed or a system having access to wind speed data, such as an Onstar system. The remote data source 60 retrieves wind speed data (i.e., remote wind speed data) for the vehicle location from any suitable source of wind speed data, such as the Internet.

The remote wind speed data corresponds to an estimated wind speed at the vehicle location. In various implementations, the remote wind speed data may be wind speed measured near or at the vehicle location. In other implementations, the remote wind speed data may be wind speed at a location nearest to the vehicle location at which wind speed data is available.

The remote data source 60 transmits the remote wind speed data to the communication module 56 via the antennas 58 and 62. The communication module 56 receives the remote wind speed data and provides the remote wind speed signal to the control module 14. In various implementations, transmission of the vehicle location and the receipt of the remote wind speed data may be once per key cycle (e.g., key ON to key OFF) or may be continuous while the engine 11 is operated.

Figure 2A:
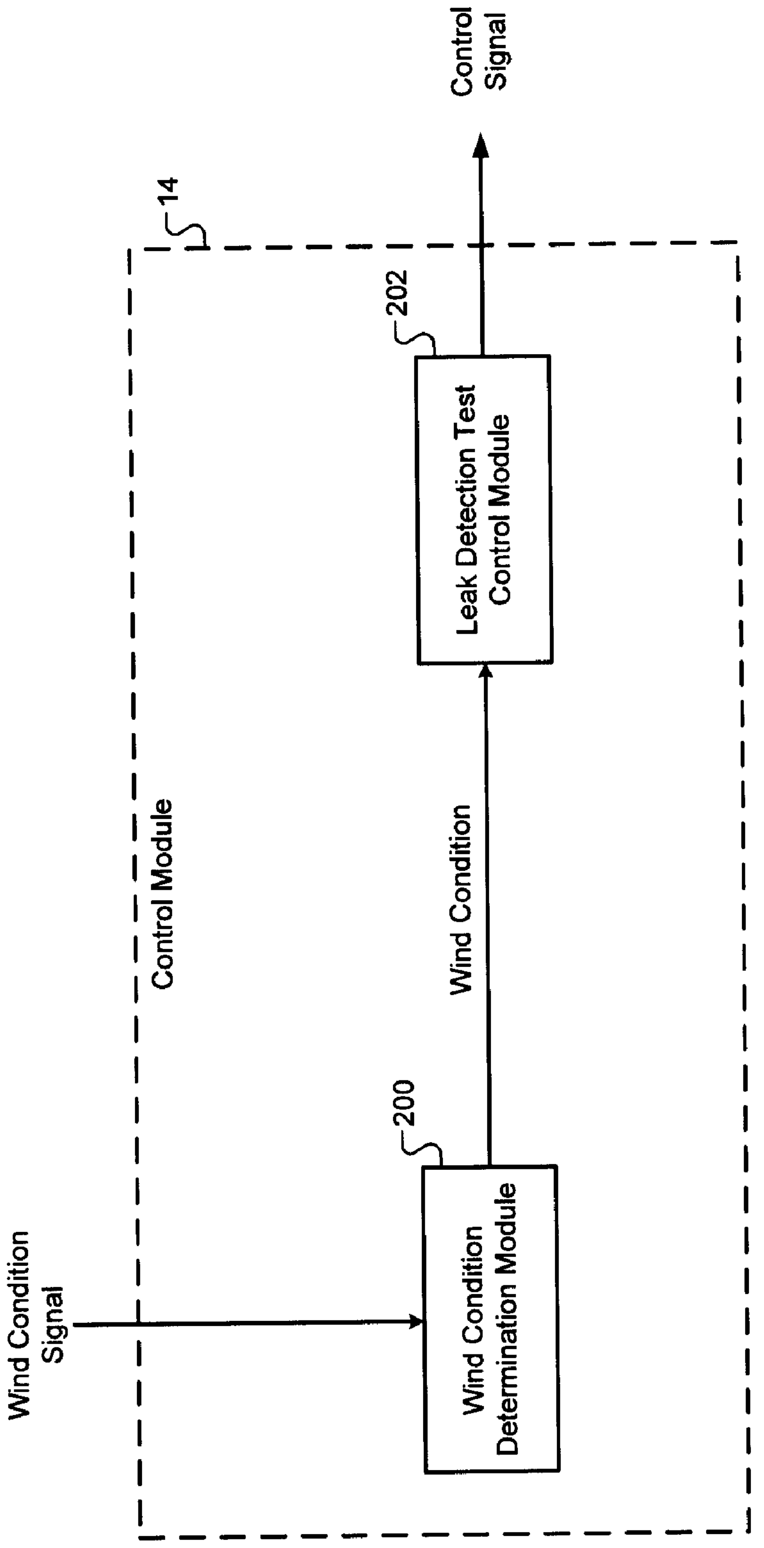
FIG. 2A is a functional block diagram illustrating exemplary modules associated with a vapor leak diagnostic system and method according to the principles of the present disclosure.

Referring now to FIG. 2A, exemplary modules associated with the vapor leak diagnostic system and method will be described in detail. The control module 14 includes a wind condition determination module 200 and a leak detection test control module 202. The wind condition determination module 200 determines a wind condition based on a wind condition signal and provides the wind condition to the leak detection test control module 202.

The leak detection test control module 202 generates a control signal based on the wind condition. When the wind condition indicates the presence of high wind, the leak detection test control module 202 outputs a control signal to disable the leak detection test. When the wind condition does not indicate the presence of high wind, the leak detection test control module 202 outputs a control signal to continue the leak detection test.

Figure 2B:
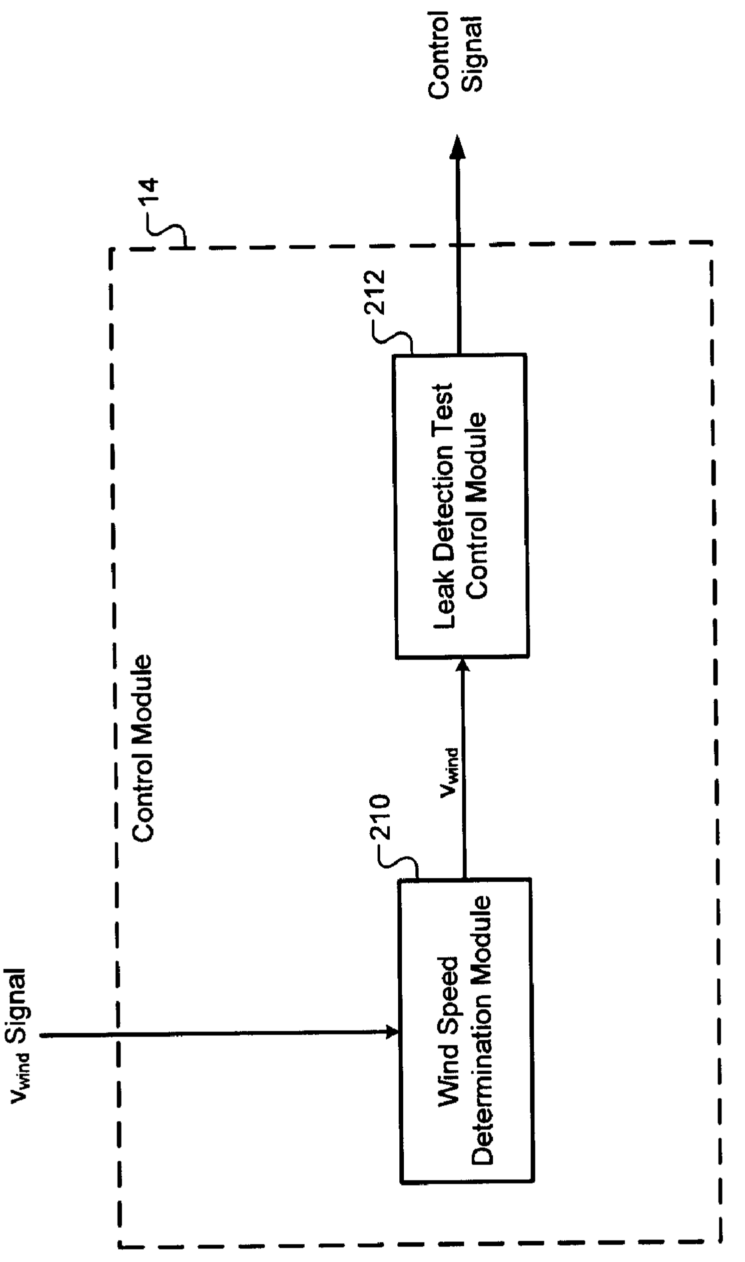
FIG. 2B is a second functional block diagram illustrating exemplary modules associated with a vapor leak diagnostic system and method according to the principles of the present disclosure.

Referring now to FIG. 2B, a second embodiment of exemplary modules associated with the vapor leak diagnostic system and method will be described in detail. The control module 14 includes a wind speed determination module 210 and a leak detection test control module 212. The wind speed determination module 210 may determine a wind speed ($v_{wind}$) based on the wind speed signal from the wind speed sensor 52. Alternatively, the wind speed determination module 210 may determine $v_{wind}$ based on the remote wind speed signal from the communications module 56. The wind speed determination module 210 provides $v_{wind}$ to the leak detection test control module 212.

The leak detection test control module 212 generates a control signal based on the wind speed. When the wind speed exceeds a predetermined wind speed threshold ($(v_{wind})_{THR}$), the leak detection test control module 212 outputs a control signal to disable the leak detection test. When the wind speed does not exceed $(v_{wind})_{THR}$, the leak detection test control module 212 outputs a control signal to continue the leak detection test.

Figure 2C:
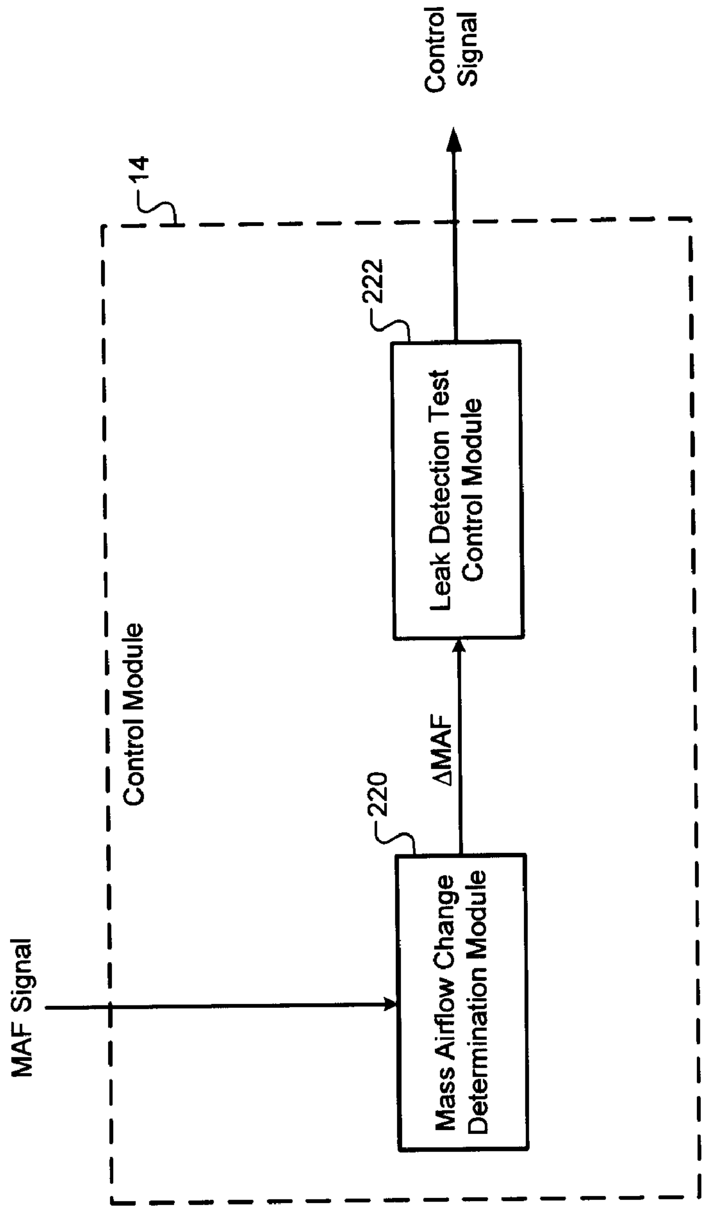
FIG. 2C is a third functional block diagram illustrating exemplary modules associated with a vapor leak diagnostic system and method according to the principles of the present disclosure.

Referring now to FIG. 2C, a third embodiment of exemplary modules associated with the vapor leak diagnostic system and method will be described in detail. The control module 14 includes a mass airflow change determination module 220 and a leak detection test control module 222. When the engine 11 is off (i.e., in a no flow condition), the mass airflow change determination module 220 determines a mass airflow (MAF) based on the signal from the MAF sensor 18.

The mass airflow change determination module 220 also determines a mass airflow change (ΔMAF) based on MAF. More specifically, the mass airflow change determination module 220 determines ΔMAF by calculating an absolute difference between a present MAF and a previous MAF. The mass airflow change determination module 220 may include a buffer that stores the present MAF and the previous MAF. The mass airflow change determination module 220 provides ΔMAF to the leak detection test control module 222.

The leak detection test control module 222 generates a control signal based on ΔMAF. When ΔMAF exceeds a predetermined mass airflow change threshold ($\Delta MAF_{THR}$), the leak detection test control module 222 outputs a control signal to disable the leak detection test. When ΔMAF does not exceed $\Delta MAF_{THR}$, the leak detection test control module 222 outputs a control signal to continue the leak detection test.

Figure 3A:
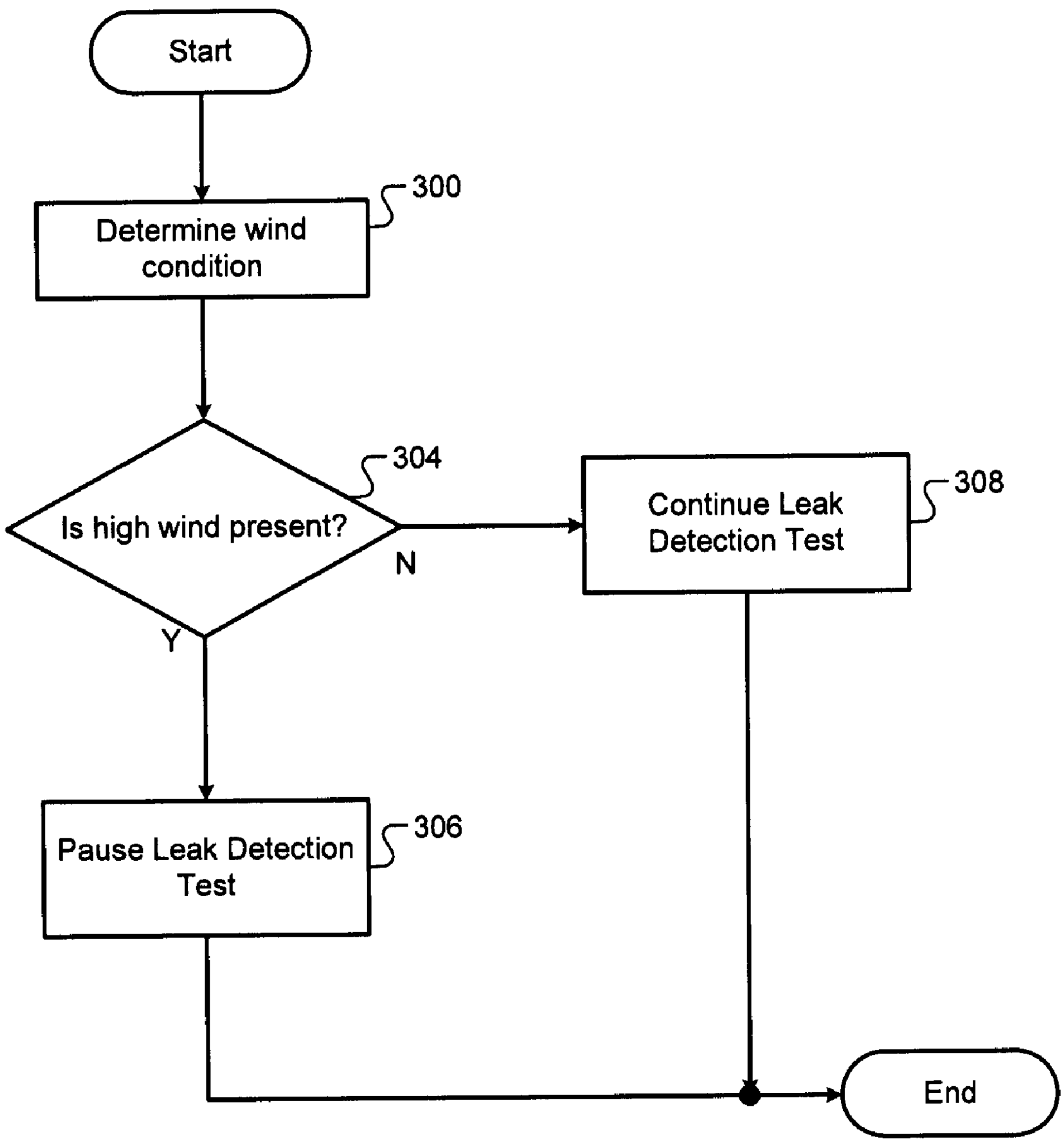
FIG. 3A is a flowchart illustrating exemplary steps executed by a vapor leak diagnostic system and method according to the principles of the present disclosure.

Referring now to FIG. 3A, exemplary steps associated with the vapor leak diagnostic system and method will be described in detail. In step 300, control determines a wind condition based on a wind condition signal. In step 302, control determines whether high wind is present. When high wind is present, control outputs a control signal to disable the leak detection test in step 304. When high wind is not present, control outputs a control signal to continue the leak detection test in step 306.

Figure 3B:
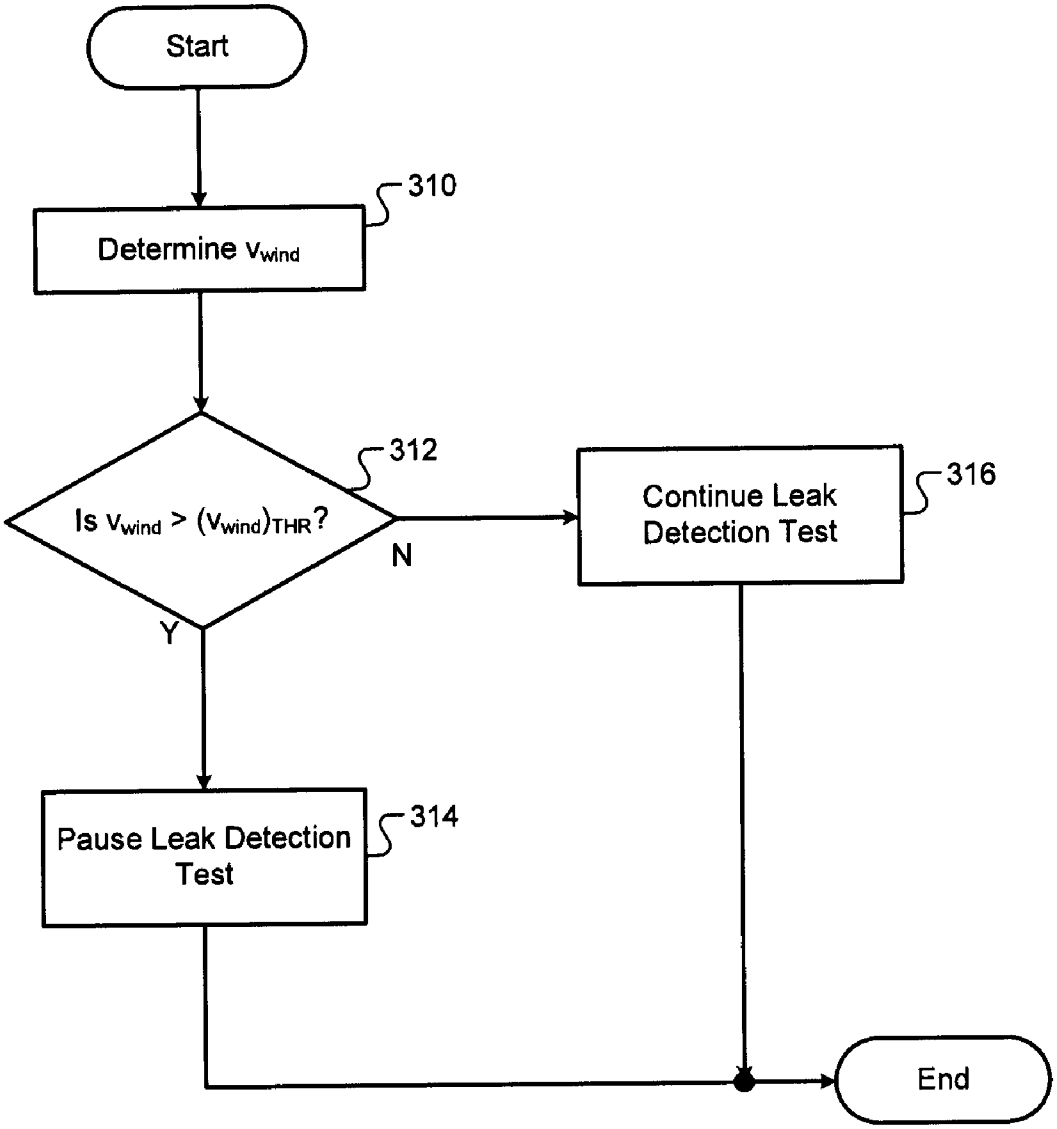
FIG. 3B is a second flowchart illustrating exemplary steps executed by a vapor leak diagnostic system and method according to the principles of the present disclosure.

Referring now to FIG. 3B, a second embodiment of exemplary steps associated with the vapor leak diagnostic system and method will be described in detail. In step 310, control may determine a wind speed ($v_{wind}$) based on a wind speed signal from the wind speed sensor 52. Alternatively, control may determine a wind speed based on the remote wind speed signal from the communication module 56.

In step 312, control determines whether the wind speed exceeds a predetermined wind speed threshold ($(v_{wind})_{THR}$), indicating the presence of high wind. When the wind speed exceeds the predetermined wind speed threshold, control outputs a control signal to disable the leak detection test in step 314. When the wind speed does not exceed the predetermined wind speed threshold, control outputs a control signal to continue the leak detection test in step 316.

Figure 3C:
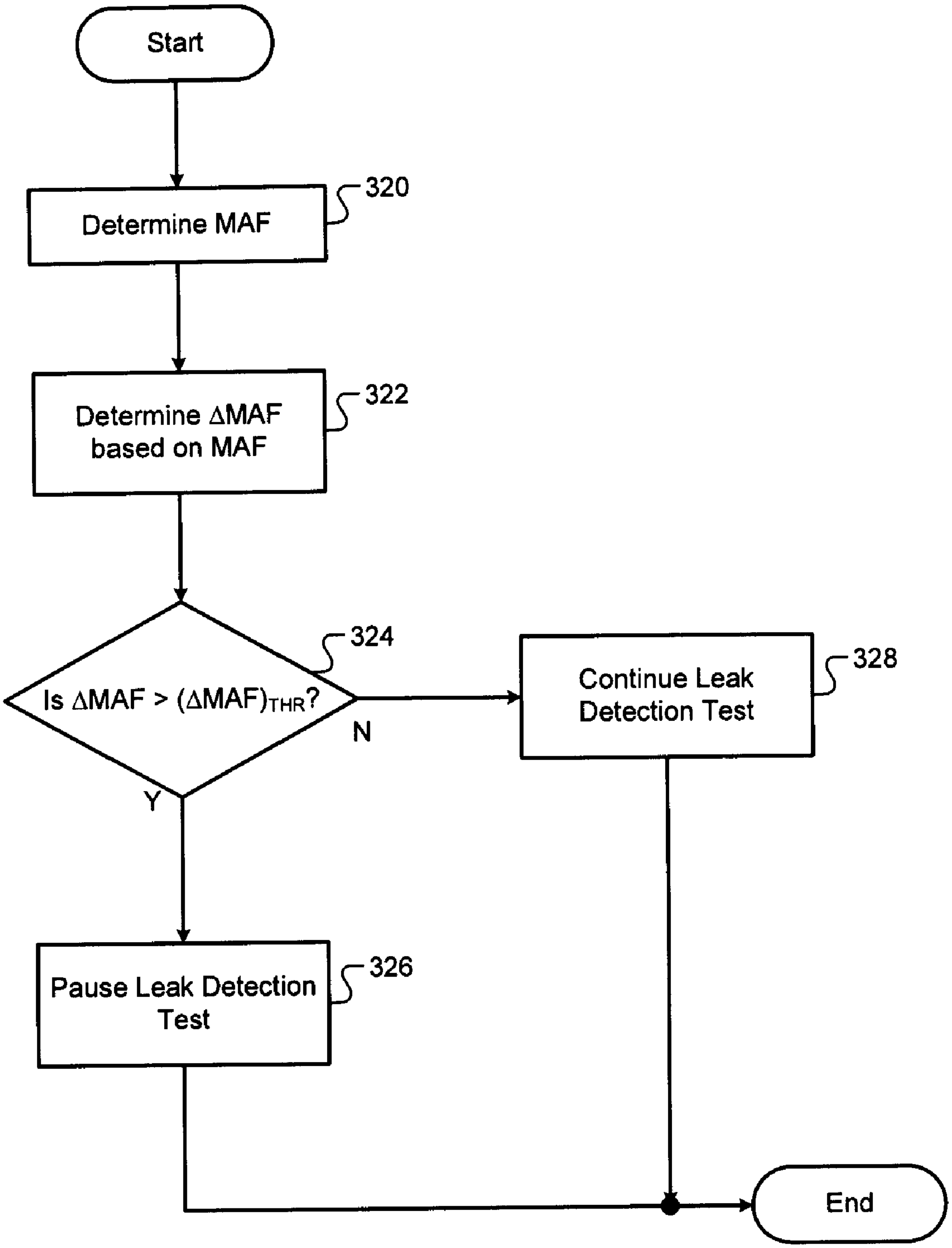
FIG. 3C is a third flowchart illustrating exemplary steps executed by a vapor leak diagnostic system and method according to the principles of the present disclosure.

Referring now to FIG. 3C, a third embodiment of exemplary steps performed by the leak detection test control will be described in detail. In step 320, control determines MAF at a predetermined sampling period (T) based on the MAF signal from the MAF sensor 18. In step 322, control determines ΔMAF based on MAF. More specifically, control determines ΔMAF by calculating an absolute difference between a present MAF and a previous MAF.

In step 324, control determines whether ΔMAF is greater than $\Delta MAF_{THR}$, indicating the presence of high wind. When ΔMAF is greater than $\Delta MAF_{THR}$, control outputs a control signal to disable the leak detection test in step 326. When ΔMAF is not greater than $\Delta MAF_{THR}$, control outputs a control signal to continue the leak detection test in step 328.

Figure 4:
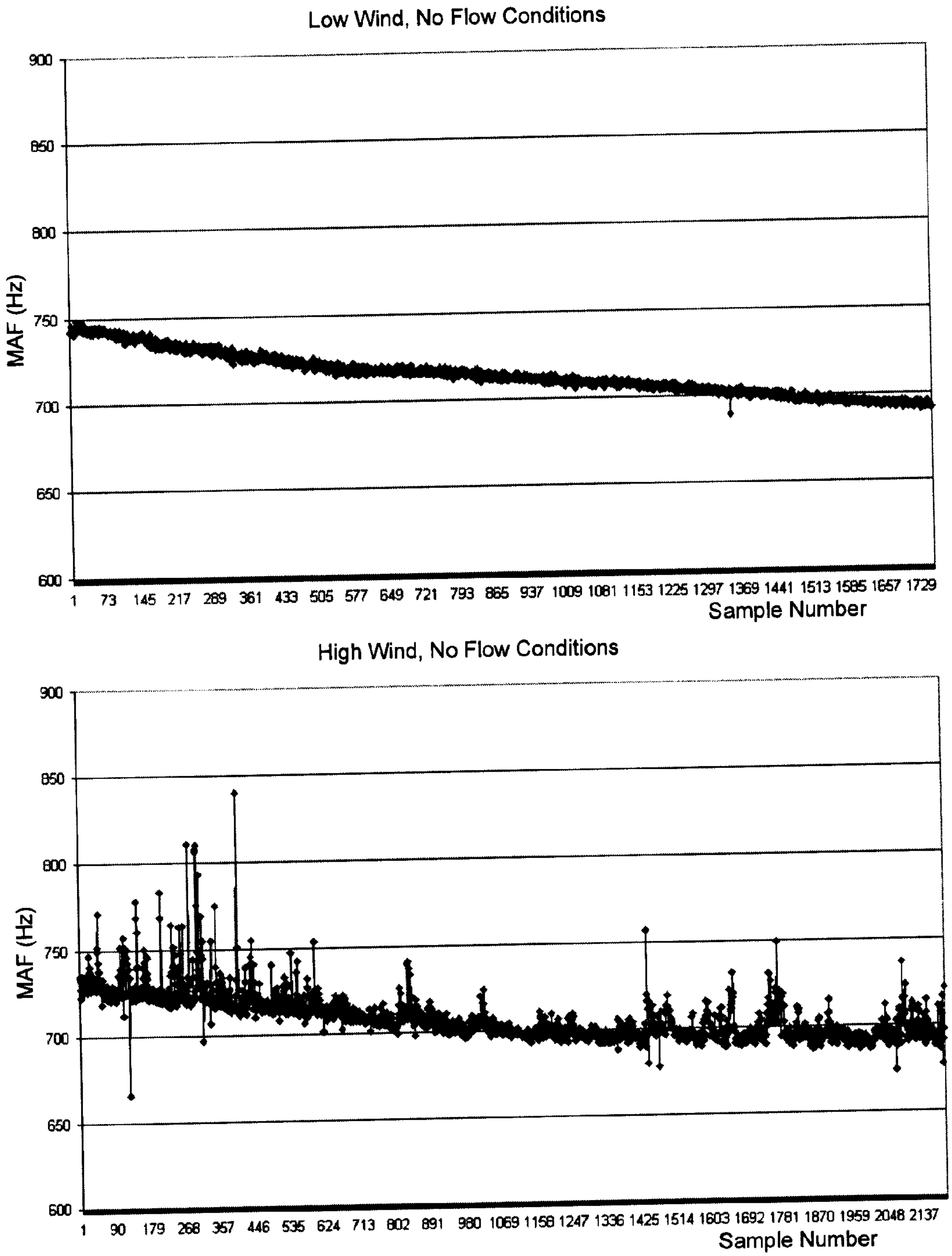
FIG. 4 is a graph illustrating exemplary signals representing mass airflow in an intake of an engine under low and high wind conditions.

Referring now to FIG. 4, a top graph illustrates an exemplary signal representing MAF in low wind and no flow conditions and a bottom graph illustrates an exemplary signal representing MAF in high wind and no flow conditions. The x-axis represents a MAF sample number, while the y-axis represents a corresponding MAF. Although MAF is represented as a frequency in units of hertz, MAF may also be represented as a mass flow rate with units such as grams per second.

As discussed above, the vapor leak diagnostic system and method may determine whether the MAF change exceeds the predetermined threshold, indicating the presence of high wind, and either disable or continue the leak detection test accordingly. In the top graph, the most significant MAF change occurs between sample numbers 1297 and 1369 and has a magnitude of approximately 20 hertz. Defining the predetermined threshold as greater than 20 hertz, the leak detection test control detects a low wind condition and continues the leak detection test. In the bottom graph, the most significant MAF change occurs between MAF sample numbers 357 and 456 and has a magnitude of approximately 150 hertz. Defining the predetermined threshold as less than 150 hertz, the leak detection test control detects a high wind condition and disables the leak detection test.

Those skilled in the art can now appreciate from the foregoing description that the broad teachings of the disclosure can be implemented in a variety of forms. Therefore, while this disclosure includes particular examples, the true scope of the disclosure should not be so limited since other modifications will become apparent to the skilled practitioner upon a study of the drawings, the specification, and the following claims.

What is claimed is:

1. A control system, comprising:

a wind condition determination module that determines a wind condition when an engine is off, wherein said wind condition includes at least one of a wind speed and a mass flowrate of air; and a leak detection test control module that selectively diagnoses a vapor leak associated with a vehicle based on said wind condition.

2. The control system of claim 1 wherein said wind condition determination module determines said wind speed based on a wind speed signal.

3. The control system of claim 2 further comprising a wind speed sensor that provides said wind speed signal.

4. The control system of claim 2 wherein said control system receives said wind speed signal from a remote data source based on a location of said vehicle.

5. The control system of claim 2 wherein said leak detection test control module compares said wind speed to a predetermined wind speed threshold and disables a leak detection test when said wind speed exceeds said predetermined wind speed threshold.

6. The control system of claim 1 wherein said wind condition includes a change in said mass flowrate of air.

7. The control system of claim 6 wherein said change is an absolute difference between a present mass flow rate of air and a previous mass flow rate of air.

8. The control system of claim 6 wherein said leak detection test control module compares said change to a predetermined change and disables a leak detection test when said change is greater than said predetermined change.

9. The control system of claim 8 wherein said leak detection test control module resumes said leak detection test when said engine is off after said engine is on for a predetermined time period.

10. The control system of claim 8 wherein said leak detection test control module continues said leak detection test when said change is less than said predetermined change.

11. A method, comprising:

determining a wind condition when an engine is off, wherein said wind condition includes at least one of a wind speed and a mass flowrate of air; and selectively diagnosing a vapor leak associated with a vehicle based on said wind condition.

12. The method of claim 11 further comprising determining said wind speed based on a wind speed signal.

13. The method of claim 12 further comprising receiving said wind speed signal from a wind speed sensor.

14. The method of claim 12 further comprising receiving said wind speed signal from a remote data source based on a location of said vehicle.

15. The method of claim 12 further comprising comparing said wind speed to a predetermined wind speed threshold and disabling a leak detection test when said wind speed exceeds said predetermined wind speed threshold.

16. A method, comprising:

determining a wind condition;

selectively diagnosing a vapor leak associated with a vehicle based on said wind condition; and determining said wind condition by determining a mass airflow in an intake of an engine when said engine is off and determining a mass airflow change based on said mass airflow.

17. The method of claim 16 further comprising determining said mass airflow change as an absolute difference between a present mass airflow and a previous mass airflow.

18. The method of claim 16 further comprising comparing said mass airflow change to a predetermined mass airflow change threshold and disabling a leak detection test when said mass airflow change exceeds said predetermined mass airflow change threshold.

19. The method of claim 18 further comprising resuming said leak detection test when said engine is off after said engine is on for a predetermined time period.

20. The method of claim 18 further comprising continuing said leak detection test when said mass airflow change is below said predetermined mass airflow change threshold.

* * * * *